United States Patent [19]
Bergkamp et al.

[11] Patent Number: 5,340,042
[45] Date of Patent: Aug. 23, 1994

[54] RECIPROCATING BLADE BALE CUTTER

[75] Inventors: Alan Bergkamp, Murdock; Kenneth W. Sowers, Kingman, both of Kans.

[73] Assignee: DewEze Manufacturing, Inc., Harper, Kans.

[21] Appl. No.: 68,771

[22] Filed: Jun. 1, 1993

[51] Int. Cl.5 .............................................. B02C 1/00
[52] U.S. Cl. ..................................... 241/283; 56/298; 241/605
[58] Field of Search ..................... 241/101.7, 283, 605; 56/298, 307, 308

[56] References Cited

U.S. PATENT DOCUMENTS

| | | |
|---|---|---|
| 27,323 | 2/1860 | Vertrees . |
| 888,491 | 5/1908 | Hampton ............... 56/298 |
| 3,098,338 | 7/1963 | Myers . |
| 3,108,421 | 10/1963 | Leverenz . |
| 3,490,214 | 1/1970 | Cullimore ............. 56/298 |
| 3,664,103 | 5/1972 | McNair ................ 56/298 |
| 3,760,571 | 9/1973 | Foster ................. 56/298 |

Primary Examiner—Douglas D. Watts
Attorney, Agent, or Firm—Litman, McMahon & Brown

[57] ABSTRACT

A horizontally oriented three sided frame is adapted to hold a round hay bale. An endless chain driven conveyor in the floor of the frame causes the round bale to rotate about a longitudinal axis while simultaneously urging a portion of the perimeter of the bale against a sickle bar cutter arrayed just above the floor on one side of the frame. The cutter chops the hay bale into manageable portions for feeding to livestock. The sickle bar cutter includes a conventional reciprocating cutter bar with triangularly shaped cutting teeth arranged continuously along the bar. A specially designed blade guide allows the entire cutting surfaces of the teeth to extend past the blade guide as they reciprocate. This insures that the hay bale is fed rapidly into the reciprocating teeth since no blade guide teeth enter the cutting gaps between the cutting teeth as they reciprocate and thus do not interfere with the advancement of the hay bale into cutter.

13 Claims, 2 Drawing Sheets

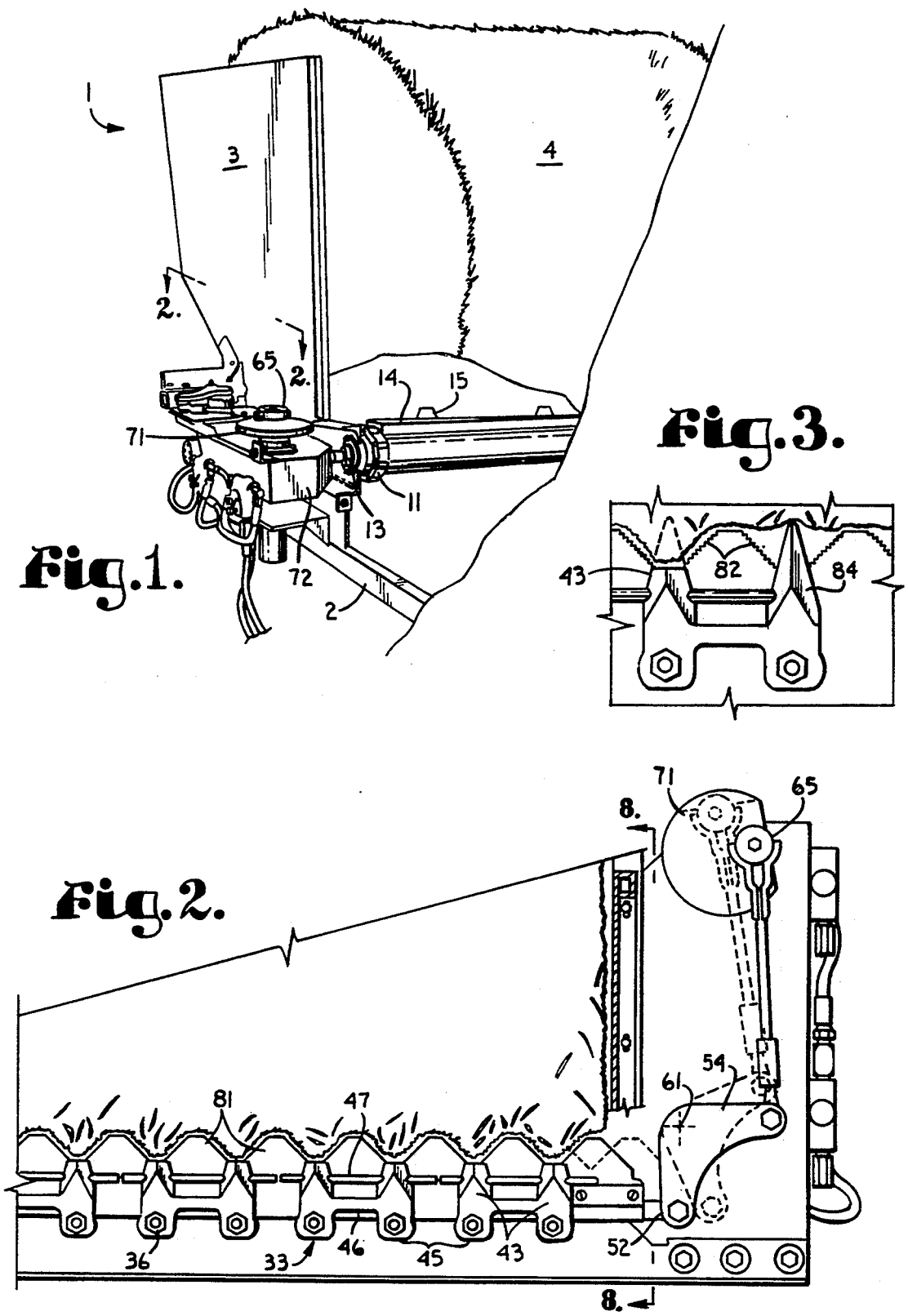

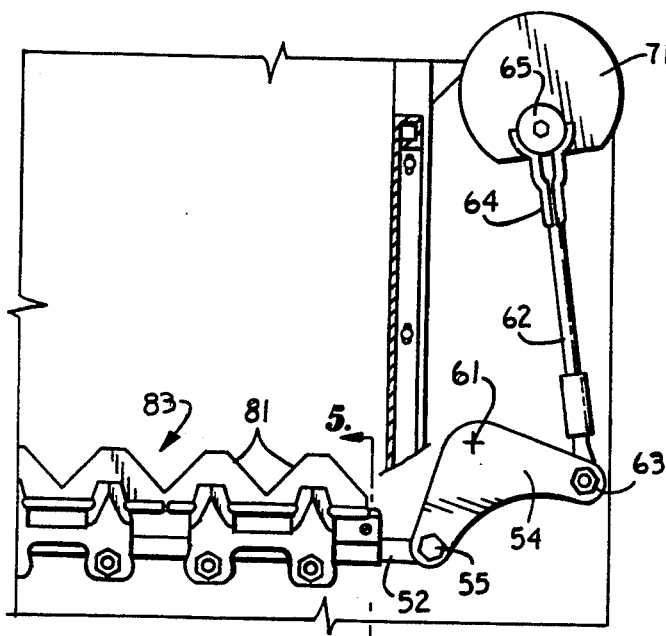
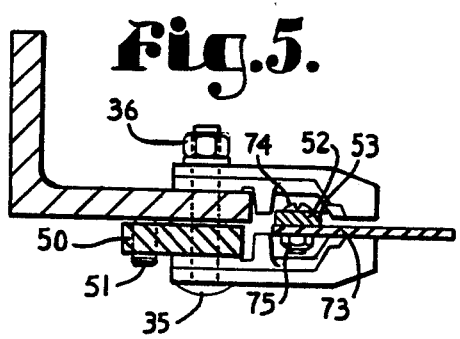
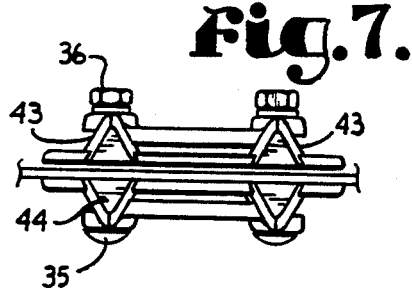
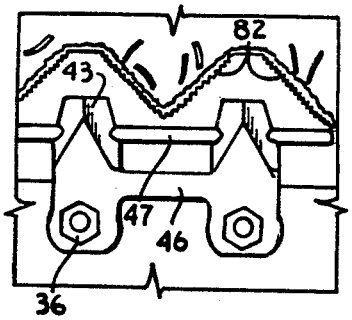
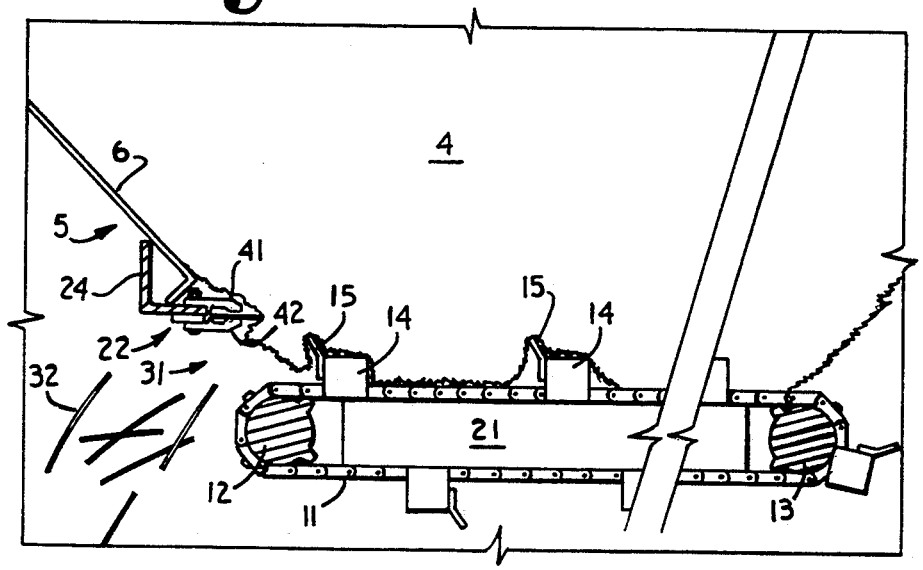

RECIPROCATING BLADE BALE CUTTER

BACKGROUND OF THE INVENTION

1. Field of the Invention

This invention is directed to a round bale cutter with an improved reciprocating blade cutter for efficiently cutting large round hay bales into manageable quantities of hay which can be more easily fed to and consumed by feeding livestock.

2. Description of the Related Art

In the past, hay for feeding livestock was cut and baled into relatively small, rectangularly shaped hay bales which were usually stored indoors in barns or other storage buildings. When the hay was needed for feeding cattle, a desired number of these small hay bales were removed from storage, brought to the livestock and broken open for feeding.

This method of storing hay in small bales has been largely replaced by the use of large round bales weighing upwards of 2000 lbs each. Often these round bales are simply left in the field and are moved only as they are needed for feeding. A problem with such large bales is that, in relatively small livestock operations, the entire bale may not be needed for feed at any one time. Even in larger farming operations, a single bale may be sufficient to feed livestock in more than one location. Thus, these bales cannot simply be carried to the livestock and broken open as were the small rectangular bales in the past.

Generally, two feeding methods have developed for feeding round bales to livestock. In a first method, the bales are placed in fixed round bale feeders which are designed to give the livestock feeding access to the bale, but which protect the bale from being trampled or otherwise destroyed by the feeding livestock. With such a round bale feeder, the bale can remain in place for extended periods to feed surrounding livestock.

In a second method, an apparatus is used which cuts the round bale into manageable portions and distributes the cut hay along the ground or into feeding bins for livestock to reach. For specialized feeding operations, such as for dairy cattle, for example, the hay must generally be cut into short strands to be mixed with additives and other feed ingredients to promote optimum milk production. For feeding range cattle, on the other hand, the hay can be cut into longer strands and fed directly to the cattle. It is this latter use to which the current invention is directed.

One prior art apparatus for chopping round hay bales is described in U.S. Pat. No. 4,693,426 to White. A tub tilted to an angle of 35° to 50° from horizontal is rotated past a number of rows of conventional sickle cutters. A round hay bale contained in the tub is cut by the sickle cutters as the tub is rotated. This round bale chopper is designed particularly for short strand cutting since the rate at which the bale is fed to the cutters can be precisely controlled.

The White apparatus and similar tilted tub choppers are complex and expensive pieces of machinery which are unnecessary for the cutting of round bales into longer strands of hay for feeding range cattle or the like, as explained above. Furthermore, these and other round bale cutters have employed conventional sickle bar cutters which were originally designed for use in cutting standing crops. These conventional sickle bar cutters achieve marginal performance when attempting to cut something as dense as a round hay bale, since the sickle bar blade guide interferes with the complete and rapid introduction of the hay bale perimeter into the cutting teeth.

It is clear then, that a need exists for a relatively simple and efficient machine for chopping round hay bales into manageable hay strands for feeding livestock. Such a machine should be capable of rapidly chopping a large round bale into strands of hay, but should be simpler and less expensive than known tilted tub choppers. Such a machine should preferably include an improved sickle bar cutter for increased efficiency and improved throughput of hay bales.

SUMMARY OF THE INVENTION

In the practice of the present invention, a round bale cutter includes a horizontally oriented three sided frame which is adapted to hold a round hay bale on an elevated floor. An endless chain drives a series of longitudinally extending bars across the floor of the frame and grasping hooks arranged along each bar grasp and rotate the round bale about a longitudinal axis. At the same time, the hooks urge a portion of the bale perimeter against a sickle bar cutter arrayed just above the floor on one side of the frame. The sickle bar cutter chops the hay bale into manageable portions for livestock feed. The sickle bar cutter includes a conventional reciprocating cutter bar with triangularly shaped cutting teeth arranged continuously along the bar. A specially designed blade guide allows the entire cutting surfaces of the teeth to extend past the blade guide teeth as they reciprocate. This insures that no guide teeth enter the cutting area as the cutting teeth reciprocate, thus allowing the hay bale to be fed rapidly into the V shaped cutting recesses between the teeth. The sickle bar cutter is thus converted into a saw which is capable of cutting up an entire round hay bale in a period of approximately 3 minutes.

OBJECTS AND ADVANTAGES OF THE INVENTION

The principle objects and advantages of the present invention include: to provide an improved reciprocating blade bale cutter apparatus; to provide such an apparatus in which a round hay bale can be rapidly and efficiently chopped into manageable portions for efficiently feeding livestock; to provide such an apparatus in which a round bale is rotated about a longitudinal axis while being urged against a sickle bar cutter; to provide such an apparatus in which the sickle bar cutter is equipped with blade guides which are designed with shortened guide teeth to permit the hay bale to be rapidly fed into the cutter surfaces with no interference from the guide teeth; to provide a method of converting a conventional sickle bar cutter to a more efficiently feed and cut hay bales by replacing the conventional guide teeth with shorter guide teeth; to provide such a method which results in the sickle bar cutter being converted into a saw; and to provide such an apparatus which is reliable, economical to manufacture, and which is particularly well suited for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a fragmentary, perspective view of a reciprocating round bale cutter, shown containing a round bale and with portions of the bale broken away to illustrate the bale conveyor mechanism.

FIG. 2 is an enlarged, cross-sectional view of the bale cutter, taken along line 2—2 of FIG. 1, and illustrating a sickle bar cutter according to the present invention.

FIG. 3 is a greatly enlarged, fragmentary view of a portion of the sickle bar cutter, illustrating a prior art blade guide design on the right and the inventive blade guide design on the left.

FIG. 4 is an enlarged, fragmentary, top plan view of the bale cutter, illustrating a portion of the sickle bar cutter and the cutter drive mechanism.

FIG. 5 is a greatly enlarged, fragmentary, cross-sectional view of a cutter tooth, blade guide and mount, taken along line 5—5 of FIG. 4.

FIG. 6 is a greatly enlarged, fragmentary view of a portion of the sickle bar cutter, illustrating details of the inventive blade guide design.

FIG. 7 is a greatly enlarged, fragmentary, end view of the sickle bar cutter section of FIG. 6 illustrating a cutter tooth, blade guide and mount.

FIG. 8 is a fragmentary, cross-sectional view of the reciprocating bale cutter, taken along line 8—8 of FIG. 2, and showing the bale being rotated and advanced against the sickle bar cutter by the bale conveyor mechanism.

DETAILED DESCRIPTION OF THE INVENTION

I. Introduction and Environment

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

2. Round Bale Cutter

Referring to the drawings in more detail the reference numeral 1 in FIG. 1 generally designates a reciprocating bale cutter in accordance with the invention. A frame 2 includes two opposing closed ends, of which one end 3 is illustrated, it being understood that the opposite end is a mirror image thereof. The frame 2 is open at one side for loading of round hay bales, such as the bale 4. The opposite side 5 is a sloping wall 6, as shown in FIG. 8.

An endless chain 11 (FIG. 8) is driven by a powered sprocket 12 and extends around an idler sprocket 13. A number of longitudinally extending bars 14 are attached to the chain 11, and each bar 14 includes a plurality of bale grasping hooks 15 arrayed along it. The chain 11 drives the bars 14 counter-clockwise, as shown in FIG. 8, in a loop over a floor 21 of the cutter 1, and returns them beneath the floor 21. The bars 14 are similarly connected to a matching chain (not shown) at the opposite end of the cutter 1. As the bars 14 move over the floor 21, the hooks 15 grasp the bale 4 and rotate it clockwise, again as shown in FIG. 8, while urging the bottom portion of the bale 4 against a sickle bar cutter 22. The bars 14 are connected on the other end to a matching driven chain (not shown).

The sickle bar cutter 22 extends longitudinally along the bale cutter 1 and is bolted to an L shaped flange 24 attached to the side wall 6. The side wall 6 is held in place above the floor 21 by a pair of brackets (not shown), leaving a slot 31 between the side wall 6 and the floor 21. As the hay bale 4 is rotated past the sickle bar cutter 22, the cutter 22 cuts the bale 4 into individual strands of hay 32 which exit the slot 31, as shown in FIG. 8. The entire cutter 1 can be mounted on a platform with ground engaging wheels (not shown), which allow it to be pulled by a tractor while the bale 4 is cut, distributing the hay strands 32 along the path of travel.

3. Sickle Bar Cutter

The sickle bar cutter 22 includes a blade guide 33 which is attached to the flange 24 via a plurality of bolts 35 and nuts 36 (FIG. 5). The blade guide 33 includes a top guide 41 and an opposing bottom guide 42, each of which include a plurality of guide teeth 43 and 44, respectively. As shown in FIG. 2, the guide 33 includes a number of separate and interchangeable guide elements 45, each of which includes a pair of the teeth 43 or 44 connected by a pair of support members 46 and 47. The top and bottom guide elements 45 are preferably identical to facilitate maintenance of the cutter 22 by allowing easy replacement should any of the guide elements 45 be broken or otherwise damaged. Referring to FIG. 5, a spacer block 50 is provided with each bottom guide element 45 to provide the proper matching spacing between the top and bottom elements 45. A threaded set screw 51 can be tightened against the bottom of the flange 24 for a tension adjustment to minimize vibration. A cutter bar 52 extends longitudinally along the bale cutter 1, and the bar 52 extends through a gap 53 between each of the top and bottom guide elements 45 (FIG. 5). The bar 52 is free to reciprocate back and forth in the gap 53. The bar 52 is attached at one end to one side of a triangular shaped pivot plate 54 via a bolt 55. The pivot plate 54 is pivotally attached to the frame 2 at a pivot point 61, and the other side of the plate 54 is attached to one end of a rod 62 via a bolt 63. The other end of the rod 62 is attached to a Y shaped yoke 64 which is connected to a rotatable pulley 65. The pulley 65 is eccentrically attached to a driven, rotatable wheel 71. As illustrated in FIG. 2, as the wheel 71 is rotated by a motor (not shown) in a housing 72, the pulley 65 pulls the yoke 64 in an eccentric path which causes the pivot plate 54 to pivot back and forth about the pivot point 61 in an arc indicated by the solid and phantom lines. This drives the cutter bar 52 in a reciprocating motion back and forth through the guide gap 53. A cutter blade 73 is attached to the cutter bar 52 via a plurality of screws 74 and nuts 75 (FIG. 5).

The cutter blade 73 comprises a number of triangularly shaped teeth 81 arranged linearly along its length. The teeth 81 preferably have sharp serrated edges 82, as shown in FIG. 6, which form a V shape cutting gap 83 between each adjacent pair of the teeth 81.

4. Sickle Bar Cutter Guide Teeth

The shape of the cutter guide teeth 43 and 44 is more clearly illustrated in FIGS. 3 and 6. FIG. 3 illustrates one of the guide elements 45 with a prior art guide tooth 84 on the right and a guide tooth 43 according to the present invention on the left. Prior art guide teeth, such as the guide tooth 84, in conventional sickle bar cutters generally extend outward as far, or even further past the cutter bar than do the cutting teeth themselves. This arrangement has proven satisfactory for cutting grass and other growing crops, where the density of the cut material is relatively thin. In such applications, there is probably a benefit from the scissors-like interaction between the cutting surfaces 82 and the longer teeth 84. However, in applications such as the round bale cutter i of the current invention, it has been found that the density of the compacted round bale 4 causes the conventional longer guide teeth 84 to prevent the bulk of the bale 4 from freely entering the cutting V gaps 83 between the cutting teeth 81. Thus, the bale 4 is not fully exposed to the reciprocating cutting action of the teeth 81, as is shown on the right side of FIG. 3. By contrast, when shorter guide teeth are used, such as the tooth 43 shown on the left in FIG. 3, the perimeter of the hay bale 4 is fully pushed into the V cutting gaps 83 and the bale 4 is cut into manageable hay strands much faster than could be achieved with the prior art longer guide teeth 84. As previously mentioned, the sickle bar cutter 22 is thus effectively converted from a scissors-type cutter into a reciprocating saw for rapidly sawing through the hay bale 4.

The shorter guide teeth 43 can be created simply by cutting off the ends of conventional guide teeth 84, as shown in phantom lines in FIG. 3, or, of course, can be manufactured initially in the shorter configuration.

It is to be understood that while certain forms of the present invention have been illustrated and described herein, it is not to be limited to the specific forms or arrangement of parts described and shown.

What is claimed and desired to be secured by Letters Patent is as follows:

1. A reciprocating blade cutter comprising:
   (a) a cutter bar driven in a reciprocating motion;
   (b) a cutter blade attached to said cutter bar and adapted to move therewith in said reciprocating motion, said cutter blade comprising a plurality of cutting teeth, each tooth extending outward from said cutter bar and including a pair of cutting edges, said cutting edges extending toward each other at an angle from said cutter bar such that a cutting gap is formed between adjacent teeth;
   (c) a stationary blade guide means positioned on at least one side of said cutter blade, said blade guide means encompassing a gap through which said bar reciprocates, said guide means comprising a plurality of stationary guide teeth arrayed on both sides of said cutter blade and extending outward in the same direction as said cutting teeth, said cutting teeth reciprocating across corresponding ones of said guide teeth, and wherein at least a portion of said guide teeth on each side of said cutter blade are of a length at which they do not substantially enter said cutting gaps as said cutting teeth reciprocate.

2. A reciprocating blade cutter as in claim 1 wherein:
   (A) al of said guide teeth are of said length.

3. A reciprocating blade cutter comprising:
   (a) a cutter bar driven in a reciprocating motion;
   (b) a cutter blade attached to said cutter bar and adapted to move therewith in said reciprocating motion, said cutter blade comprising a plurality of cutting teeth, each tooth extending outward from said cutter bar and including a pair of cutting edges, said cutting edges extending toward each other at an angle from said cutter bar such that a cutting gap is formed between adjacent teeth;
   (c) a stationary blade guide means positioned on at least one side of said cutter blade, said blade guide means encompassing a gap through which said bar reciprocates, said guide means comprising a plurality of stationary guide teeth extending outward in the same direction as said cutting teeth, said cutting teeth reciprocating across corresponding ones of said guide teeth, and wherein said guide teeth are of a length at which they do not substantially enter said cutting gaps as said cutting teeth reciprocate; and wherein
   (c) said blade cutter is mounted in a round bale cutter and is adapted to cut a round hay bale positioned in said round bale cutter into manageable livestock feed.

4. A reciprocating blade cutter as in claim 3, wherein:
   (a) said round bale cutter comprises means for driving said cutter bar in said reciprocal motion.

5. A reciprocating blade cutter as in claim 4, wherein:
   (a) said round bale cutter comprises means for rotating said round hay bale about a longitudinal axis while simultaneously urging a portion of the perimeter of said round hay bale against said reciprocating cutting teeth.

6. A reciprocating blade cutter as in claim 5, wherein:
   (a) said round bale cutter comprises means for ejecting said livestock feed.

7. A method of converting a conventional reciprocating sickle bar cutter to more efficiently cut dense materials, such as baled hay, said conventional cutter including a reciprocating cutter bar with a plurality of cutting teeth attached thereto, each of said cutting teeth including two cutting surfaces extending at an angle with respect to said cutter bar to form respective cutting gaps between adjacent cutting teeth, said sickle bar cutter also including a corresponding plurality of stationary conventional guide teeth extending as long or longer than, and in the same direction as said cutting teeth and arranged on the top and bottom of said cutting teeth, said cutting teeth reciprocating across corresponding ones of said conventional guide teeth with said conventional guide teeth substantially entering said cutting gaps as said cutting teeth reciprocate; said method including the step of:
   (a) replacing said conventional guide teeth with guide teeth of a length in which the ends of said replacement guide teeth do not substantially enter said cutting gaps as said cutting teeth reciprocate.

8. A method as in claim 7, wherein said cutting teeth are generally triangular in shape, and said cutting gaps are generally V shaped, with an innermost portion of said V shaped gaps positioned nearest said cutter bar, and wherein said shortening step includes:
  (a) providing said replacement guide teeth which reach approximately to the innermost portion of said respective V shaped gaps.

9. A method as in claim 7, wherein said replacing step comprises:
  (a) cutting said conventional guide teeth to produce said replacement guide teeth.

10. A round hay bale cutter for cutting a round hay bale into manageable livestock feed, said round bale cutter comprising:
  (a) means for holding said round hay bale and rotating said round hay bale about a longitudinal axis thereof while simultaneously urging a portion of the perimeter of said round hay bale against said a reciprocating cutter, said reciprocating cutter comprising:
    (i) a cutter bar driven in a reciprocating motion;
    (ii) a cutter blade attached to said cutter bar and adapted to move therewith in said reciprocating motion, said cutter blade comprising a plurality of cutting teeth, each tooth extending outward from said cutter bar and including a pair of cutting edges, said cutting edges extending toward each other at an angle from said cutter bar such that a cutting gap is formed between adjacent teeth; and
    (iii) a stationary blade guide means positioned on at least one side of said cutter blade, said blade guide means encompassing a gap through which said bar reciprocates, said guide comprising a plurality of stationary guide teeth extending outward in the same direction as said cutting teeth, said cutting teeth reciprocating across corresponding ones of said guide teeth, and wherein at least a portion of said guide teeth are of a length at which they do not substantially enter said cutting gaps as said cutting teeth reciprocate;
  (b) means for driving said cutter bar in said reciprocal motion; and
  (c) means for ejecting said livestock feed.

11. A reciprocating blade cutter as in claim 10, wherein:
  (a) all of said guide teeth are of said length.

12. A reciprocating blade cutter as in claim 10, wherein:
  (a) each of said cutting teeth is substantially triangular in shape and each of said cutting gaps is substantially V shaped.

13. A reciprocating blade cutter comprising:
  (a) a cutter bar driven in a reciprocating motion;
  (b) a cutter blade attached to said cutter bar and adapted to move therewith in said reciprocating motion, said cutter blade comprising a plurality of substantially triangular shaped cutting teeth, each tooth extending outward from said cuter bar and including a pair of cutting edges, said cutting edges extending toward each other at an angle from said cutter bar such that a substantially V shaped cutting gap is formed between adjacent teeth; and
  (c) a stationary blade guide means positioned on at least one side of said cutter blade, said blade guide means encompassing a gap through which said bar reciprocates, said guide comprising a plurality of stationary guide teeth extending outward in the same direction as said cutting teeth, said cutting teeth reciprocating across corresponding ones of said guide teeth, and wherein said guide teeth are of a length at which they do not substantially enter said cutting gaps as said cutting teeth reciprocate.

* * * * *